US006961329B1

(12) United States Patent
Bender et al.

(10) Patent No.: US 6,961,329 B1
(45) Date of Patent: Nov. 1, 2005

(54) METHOD AND APPARATUS FOR FORWARDING MESSAGES AMONG MULTIPLE RADIO NETWORKS

(75) Inventors: Paul E. Bender, San Diego, CA (US); Ramin Rezaiifar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 724 days.

(21) Appl. No.: 09/593,289

(22) Filed: Jun. 13, 2000

(51) Int. Cl.[7] .......................... H04B 7/216; H04Q 7/20
(52) U.S. Cl. ..................... 370/342; 370/335; 370/338; 455/458; 455/552.1; 455/433
(58) Field of Search ............................... 370/335, 342, 370/328, 338, 347, 401, 466; 455/445, 458, 455/433, 426.1, 426.2, 432.1, 432.2, 432.3, 455/435.2, 435.1, 552.1

(56) References Cited

U.S. PATENT DOCUMENTS

| 4,901,307 A | | 2/1990 | Gilhousen et al. | |
|---|---|---|---|---|
| 5,103,459 A | | 4/1992 | Gilhousen et al. | |
| 5,978,685 A | | 11/1999 | Laiho | |
| 6,122,263 A | * | 9/2000 | Dahlin et al. | 370/401 |
| 6,181,683 B1 | * | 1/2001 | Chevillat et al. | 370/335 |
| 6,230,009 B1 | * | 5/2001 | Holmes et al. | 455/445 |
| 6,389,008 B1 | * | 5/2002 | Lupien et al. | 370/338 |
| 6,463,055 B1 | * | 10/2002 | Lupien et al. | 370/353 |
| 6,560,457 B1 | * | 5/2003 | Silver et al. | 455/445 |
| 6,600,920 B1 | * | 7/2003 | Stephens et al. | 455/458 |

FOREIGN PATENT DOCUMENTS

| EP | 0514360 A2 | 11/1992 |
|---|---|---|
| EP | 0851703 A2 | 7/1998 |
| WO | 00/05907 | 2/2000 |

* cited by examiner

*Primary Examiner*—Steven Nguyen
(74) *Attorney, Agent, or Firm*—Philip Wadsworth; Sandra L. Godsey; Thomas R. Rouse

(57) ABSTRACT

Techniques to forward unsolicited messages from an (IS-2000) CDMA radio network via an HDR radio network to an access terminal. A session is first established between the access terminal and the HDR radio network. During session establishment or thereafter, the access terminal indicates to the HDR radio network an interest in receiving unsolicited messages from the CDMA radio network, and may further indicates an interest to be paged for a particular set of service options. The access terminal typically also registers with the CDMA radio network. Thereafter, unsolicited messages can be sent from a mobile station controller (MSC) to the HDR and CDMA radio networks, or sent from the MSC to the CDMA radio network, which then forwards the messages to the HDR radio network. The HDR radio network encapsulates the unsolicited messages and sends the encapsulated messages on a forward traffic channel, a designated control channel cycle, or via other channels to the access terminal. The forwarding of unsolicited messages allows the CDMA radio network to communicate with (e.g., page) and provide service to an access terminal that is in communication with, or is tuned to the HDR radio network.

26 Claims, 5 Drawing Sheets

METHOD AND APPARATUS FOR FORWARDING MESSAGES AMONG MULTIPLE RADIO NETWORKS

BACKGROUND OF THE INVENTION

I. Field of the Invention

The present invention relates to data communication. More particularly, the present invention relates to a novel and improved method and apparatus for forwarding messages among multiple radio networks.

II. Description of the Related Art

The use of code division multiple access (CDMA) modulation techniques is one of several techniques for facilitating communication in which a large number of system users are present. Although other multiple access communication system techniques are known in the art, such as time division multiple access (e.g., TDMA and GSM), frequency division multiple access (FDMA), and AM modulation schemes such as amplitude companded single sideband (ACSSB), the spread spectrum modulation techniques of CDMA have significant advantages over these other modulation techniques for multiple access communications systems.

The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990, and U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992. A newer generation CDMA communications system designed to efficiently transmit packet data is disclosed in U.S. patent application Ser. No. 08/963,386, entitled "METHOD AND APPARATUS FOR HIGH RATE PACKET DATA TRANSMISSION," filed Nov. 3, 1997 (hereinafter, the HDR system), now U.S. Pat. No. 6,574,211. These patents and patent application are assigned to the assignee of the present invention and incorporated herein by reference.

CDMA systems are typically designed to conform to one or more particular CDMA standards. Examples of such CDMA standards include the "TIA/EIA/IS-95-B Mobile Station-Base Station Compatibility Standard for Wideband Spread Spectrum Cellular Systems" (hereinafter the IS-95 standard), the TIA/EIA/IS-98-A, -B, and -C standards entitled "Recommended Minimum Performance Standard for Dual-Mode Spread Spectrum Cellular and PCS Mobile Stations" (hereinafter, the IS-98 standard), and the TIA/EIA/IS-2000.1 through 2000.6 and TIA/EIA/IS-2000-A.1 through A.6 standards entitled ". . . Standards for cdma2000 Spread Spectrum Systems" (hereinafter collectively, the IS-2000 standard). New CDMA standards are continually proposed and adopted for use.

Given the ever-growing demands for wireless data communication for a variety of applications, multiple radio networks may be concurrently deployed to cover a particular geographic area. One radio network (e.g., an IS-2000 CDMA radio network) may be deployed to provide voice services and another radio network (e.g., an HDR radio network) may be deployed to provide packet data services. Theses radio networks may interact via a network interface, such as the one defined by the "Inter-operability Specification (IOS) for cdma2000 Access Network Interfaces" (hereinafter, the Inter-operability Specification).

A multi-mode access terminal can be designed to communicate with multiple radio networks. To simplify the design, the access terminal is typically in active communication with, or is tuned to, only one radio network at any given moment. For enhanced services, it is desirable for the access terminal, while in communication with or tuned to one radio network, to receive messages and pages from other radio network.

Thus, techniques to forward messages from one radio network to another radio network, and to transmit these messages to an access terminal is highly desirable.

SUMMARY OF THE INVENTION

The present invention provides novel and improved techniques to forward unsolicited CDMA messages from a CDMA radio network (e.g., an IS-2000 CDMA radio network) to an HDR radio network. The unsolicited CDMA messages are messages originated from the CDMA radio network and sent to an access terminal without the mobile station initiating the transaction. These unsolicited messages are not in response to an inquiry from the access terminal and may include, for example, general paging messages (GPM), paging request messages, and other messages from the CDMA radio network. The forwarding of unsolicited CDMA messages allows the CDMA radio network to communicate (e.g., page) an access terminal that is in communication with, or is tuned to the HDR radio network. This allows the access terminal to receive services from the CDMA radio network even though it is not presently tuned to that radio network.

An embodiment of the invention provides a method for receiving, at an access terminal, messages that have been forwarded from a second (e.g., IS-2000) radio network to a first (e.g., HDR) radio network. In accordance with the method, a session is first established between the access terminal and the first radio network. During session establishment or thereafter, the access terminal indicate to the first radio network an interest in receiving unsolicited messages from the second radio network, and may further indicates an interest to be paged for a particular set of service options. The access terminal typically also registers with the second radio network even when it is tuned to the first radio network. Thereafter, the access terminal can receive encapsulated messages from the first radio network. Each encapsulated message includes an unsolicited message from the second radio network that has been forwarded to the first radio network.

The access terminal can send a first (e.g., EncapsulateCDMA) message to the first radio network to request the encapsulating and forwarding of the unsolicited messages. To implement a "keep-alive" mechanism, the first message can be sent periodically within a first time interval (e.g., 10 minutes or less). The encapsulating and forwarding of the unsolicited messages can cease if the first message is not received within a second time interval (e.g., twice as long as the first time interval). The access terminal can also send a second (e.g., StopEncapsulateCDMA) message to the first radio network to request termination of the encapsulating and forwarding of the unsolicited messages.

The unsolicited messages can be sent from a mobile station controller (MSC) to the first and second radio networks. Alternatively, the unsolicited messages can be sent from the MSC to the second radio network, which then forwards the messages to the first radio network. The encapsulated messages can be sent to the access terminal on a forward traffic channel, a designated control channel cycle, or via other channels.

In response to receiving an encapsulated message from the first radio network, the access terminal can send a page response message to the second radio network. The access terminal can also establish a connection with the second radio network to receive a voice call and/or a data call.

The encapsulated message can include, for example, an access terminal identifier (ATI) Record field indicative of an address of the access terminal, a Message ID field that indicates that the message is an encapsulated message, and a message field that consists of the encapsulated message itself. Other message formats can also be used.

Another embodiment of the invention provides a method for forwarding messages from a second (e.g., IS-2000) radio network (e.g., an IS-2000 CDMA base station controller or CDMA BSC) via a first (e.g., HDR) radio network to an access terminal. In accordance with the method, a session is established between the access terminal and the first radio network. During session establishment or thereafter, an indication is received from the access terminal of an interest in receiving unsolicited messages from the second radio network. Thereafter, unsolicited messages from the second radio network are received and encapsulated. The encapsulated messages are then sent to the access terminal.

A first (e.g., EncapsulateCDMA) message can be received from the access terminal to request the encapsulating and forwarding of unsolicited messages. Again, to implement a keep-alive mechanism, the first message can be received periodically from the access terminal, and the encapsulating and forwarding of the unsolicited messages can cease if the first message is not received within a particular time interval. A second (e.g., StopEncapsulateCDMA) message can be received from the access terminal to request termination of the encapsulating and forwarding of unsolicited messages. Various features described above can also be implemented.

The invention further provides access terminals and access points (used in the HDR radio network) capable of implementing the methods described above. Other aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
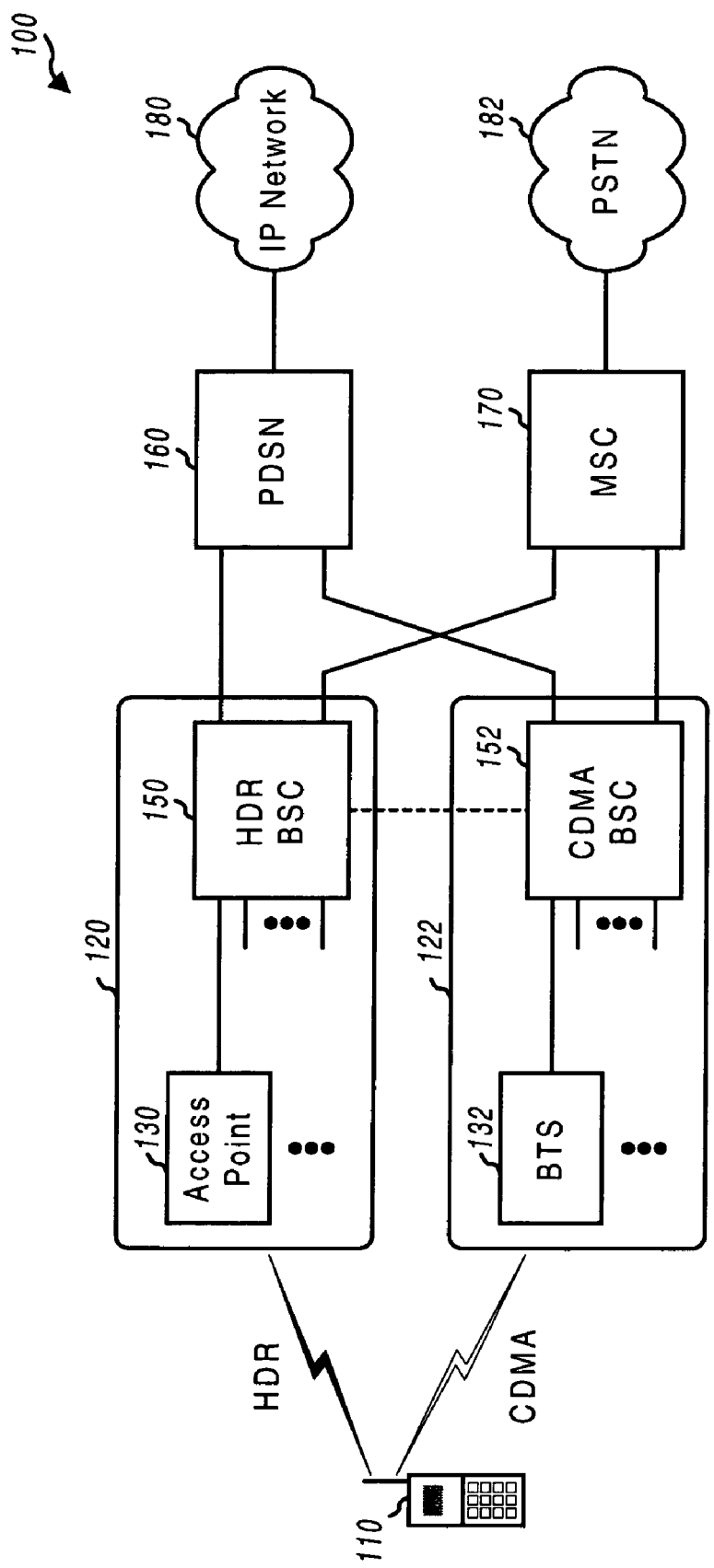
FIG. 1 is a diagram of an embodiment of a communications system that includes a high data rate (HDR) radio network deployed in conjunction with a CDMA radio network.

FIG. 1 is a diagram of an embodiment of a communications system 100 that includes a high data rate (HDR) radio network 120 deployed in conjunction with a wireless telephony radio network 122. HDR radio network 120 can be implemented based on the designed described in the aforementioned U.S. patent application Ser. No. 08/963,386, now U.S. Pat. No. 6,574,211, issued on Jun. 3, 2003, and can be used to efficiently transmit packet data. Telephony radio network 122 can be a CDMA, TDMA, or GSM radio network and can conform to any set of standards (e.g., IS-95, IS-2000, and so on). In a specific embodiment, telephony radio network 122 is a CDMA radio network that conforms to the IS-2000 standard. HDR radio network 120 can be used to support wireless Internet services in fixed, portable, and mobile environments, and CDMA radio network 122 can be used to support voice and other services.

The dual deployment and use of the HDR and CDMA radio networks can be achieved as described in U.S. patent application Ser. No. 09/575,073, entitled "HIGH DATA RATE WIRELESS PACKET DATA COMMUNICATIONS SYSTEM," filed May 19, 2000, now U.S. Pat. No. 6,574,211, issued on Jun. 3, 2005, assign to the assignee of the present invention and incorporated herein.

HDR radio network 120 includes a number of access points 130 that interface with a number of HDR base station controllers (HDR BSC) 150 (only one of each is shown in FIG. 1 for simplicity). Each HDR BSC 150 further couples to a packet data serving node (PDSN) 160 and to a mobile switching center (MSC) 170. PDSN 160 supports packet data transmission and can couple to an IP network 180 that further interconnects with other networks and servers used to support packet data transmission. MSC 170 directs the operation of the HDR and CDMA radio networks.

CDMA radio network 122 includes a number of base station transceivers (BTS) 132 that interface with a number of CDMA base station controllers (CDMA BSC) 152 (again, only one of each is shown in FIG. 1 for simplicity). Each CDMA BSC 152 further couples to PDSN 160 and MSC 170, and can further couple to HDR BSC 150 as indicated by the dashed line. MSC 170 further couples to a public switched telephone network (PSTN) 182 that supports communication with conventional (wireline) telephones. The operation of the HDR and CDMA radio networks is known in the art and not described in detail herein.

Access points 130 in the HDR radio network can be packaged in separate units that can be co-located with BTS 132. This deployment offers flexibility in allowing service providers to deploy HDR equipment from manufacturers that may not be the same as the phone network equipment providers. Alternatively, access points 130 can be integrated within BTS 132. Various deployments of the HDR and CDMA radio networks are possible and are within the scope of the invention.

For enhanced compatibility and flexibility, the functionality of HDR radio network 120 can be designed to map to the functionality of CDMA radio network 122. This allows HDR radio network 120 to be integrated with CDMA radio network 122 and to connect to the same PDSN 160. The RF characteristics of the HDR radio network can be designed to be similar to those of the CDMA radio network. This allows the HDR and CDMA radio networks to share cell sites, towers, antennas, and other system elements. A dual mode access terminal 110 can be used to receive services (e.g., voice, data, and others) from either the CDMA radio network or the HDR radio network, or both.

Although HDR radio network 120 can conform to the same model as CDMA radio network 122, there are no dependencies between these radio networks. HDR radio network 120 can thus be deployed independently from, in conjunction with, or integrated with CDMA radio network 122. Various deployments of the HDR radio network using various architectures are thus possible, some of which are described in the aforementioned U.S. patent application Ser. No. 09/575,073, now U.S Pat. No. 6894,994, issued on May 17, 2005.

Within communications system 100, a number of access terminals 110 (only one is shown in FIG. 1 for simplicity) communicate with access points 130 of the HDR radio network and BTS 132 of the CDMA radio network. Each access terminal 110 communicates with one or more access points 130 and/or one or more BTS 132 over a wireless link for a communication, depending on whether the access terminal is in soft hand-off and depending on whether the access terminal has registered with one or both radio networks. A dual mode access terminal 110 can be used to receive services from either the CDMA radio network or the HDR radio network, or both (and possibly concurrently).

Access terminal 110 can be implemented in various physical embodiments such as, for example, a modem, a phone, a module, or some other units. Access terminal 110 may include a data interface that allows the access terminal to interface with other devices (e.g., a computer, an appliance, personal digital assistances (PDAs), set-top boxes, printers, and so on) via a wireless or wireline link and using various interconnection layers. In the specific example shown in FIG. 1, access terminal 110 is in communication with the HDR radio network (as shown by the solid bolted line) and has registered with, but is not tuned to, the CDMA radio network (as shown by the unshaded bolted line).

Figure 2:
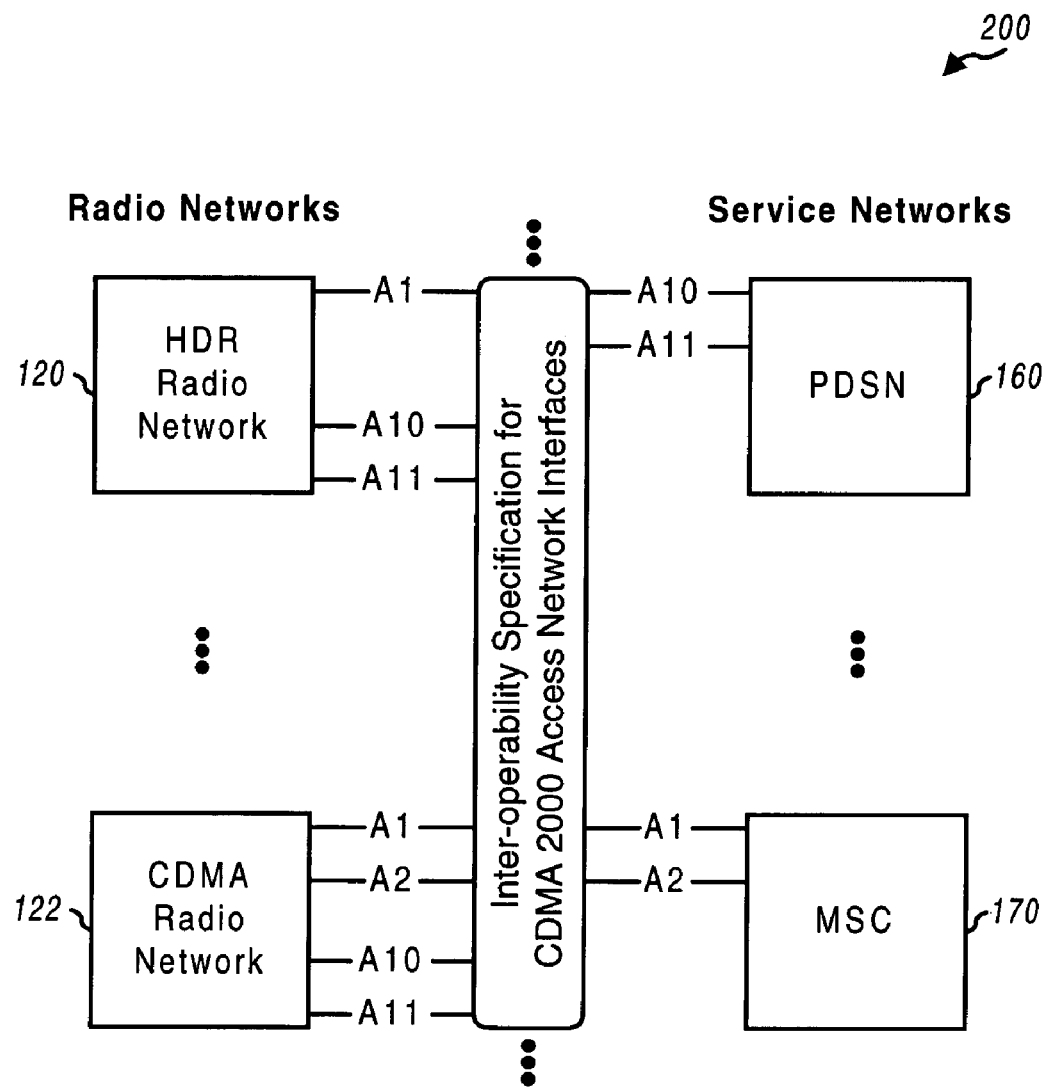
FIG. 2 is a block diagram of an access network that includes one or more radio networks interconnected to one or more service networks.

FIG. 2 is a block diagram of an access network 200 that includes one or more radio networks interconnected to one or more service networks. The radio networks can include HDR radio network 120, CDMA radio network 122, some other radio networks, or a combination thereof. The service networks can include PDSN 160, MSC 170, some other service networks, or a combination thereof. Radio networks 120 and 122 provide radio access for the access terminals within these networks. PDSN 160 provides packet data services to the access terminals and performs conventional network access point functionality such as, for example, Point-to-Point Protocol (PPP), RADIUS protocol, and mobile IP protocol. These radio networks and service networks are described in greater detail in the aforementioned U.S. patent application Ser. No. 09/575,073, now U.S. Pat. No. 6,894,994, issued on May 17, 2005.

As shown in FIG. 2, each radio network interfaces to the service networks via one or more network interfaces defined in the aforementioned Inter-operability Specification. For packet data services, the interfaces are the PCF to PDSN traffic interface (A10) and the PCF to PDSN signaling interface (A11). For IS-41 and PSTN services, the interfaces are the BSC to MSC signaling interface (A1) and the BSC to MSC PCM traffic interface (A2). For example, HDR radio network 120 can interface with each of PDSN 160 and MSC 170 via the A1, A10, and A11 interfaces. Similarly, CDMA radio network 122 can interface with each of PDSN 160 and MSC 170 via the A1, A2, A10, and A11 interfaces. In particular, the interconnection between each of the HDR and CDMA BSCs and the PDSN can be achieved via an "R-P" interface, which is part of the "A-interface" used to interconnect the radio and service networks.

Figure 3:
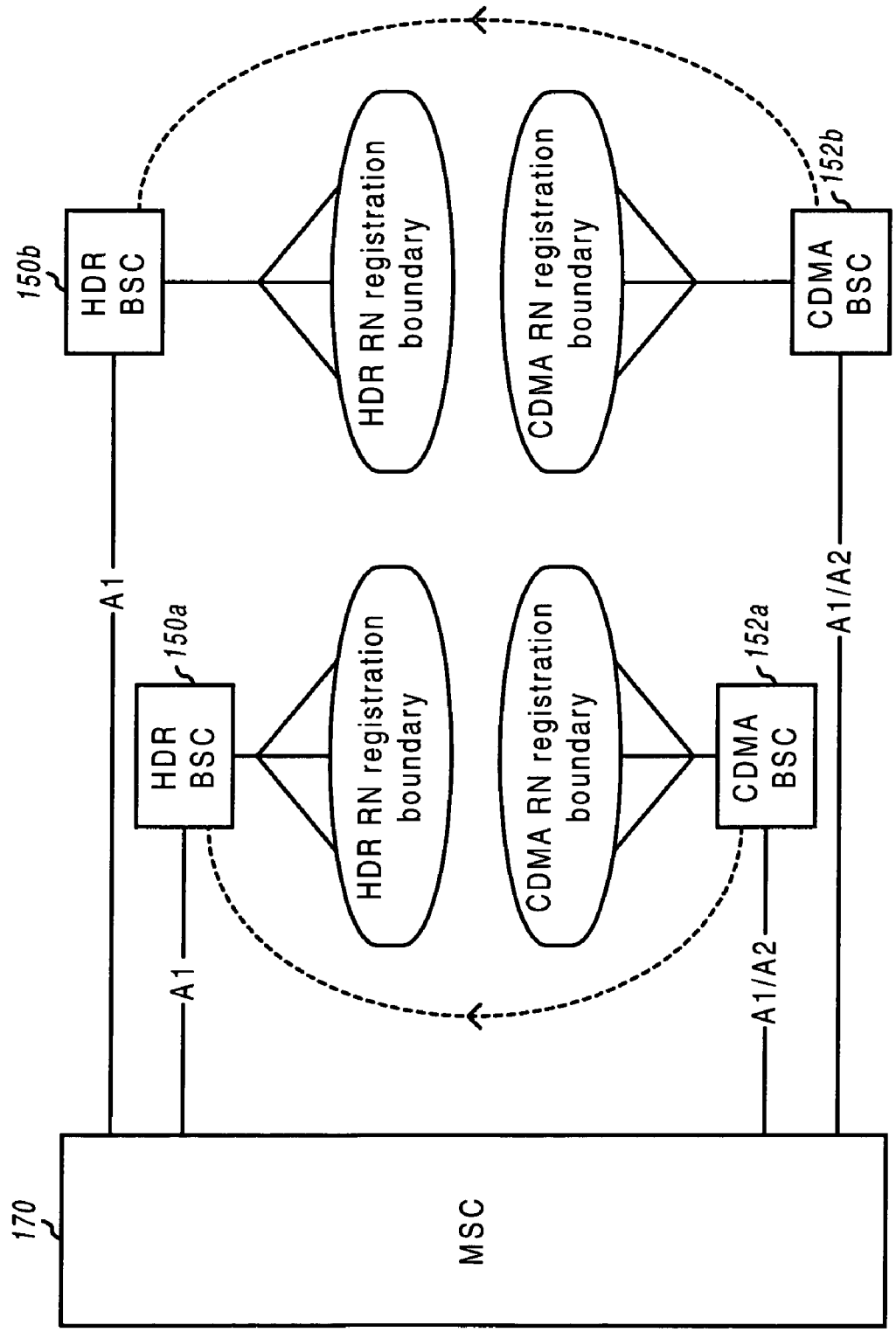
FIG. 3 is a diagram of an embodiment of the interconnections between the HDR and CDMA radio networks.

FIG. 3 is a diagram of an embodiment of the interconnections between the HDR and CDMA radio networks. As shown in FIG. 3, MSC 170 communicates with a number of HDR BSCs 150 via the A1 interface and with a number of CDMA BSCs 152 via the A1 and A2 interfaces. Each HDR BSC 150 and each CDMA BSC 152 is designed to cover a particular coverage area. When an access terminal enters an HDR radio network coverage area (i.e., the HDR registration boundary), it can initiate a registration with the particular HDR BSC 150 that covers that coverage area. Similarly, when the access terminal enters a CDMA radio network coverage area, it can initiate a registration with the particular CDMA BSC 152 that covers that coverage area. Although not shown in FIG. 3 for clarity, the HDR and CDMA radio network registration boundaries typically overlap, and can be designed to be approximately aligned. Thus, the access terminal can typically register with both of the HDR and CDMA radio networks upon entering a particular coverage area.

Figure 4:
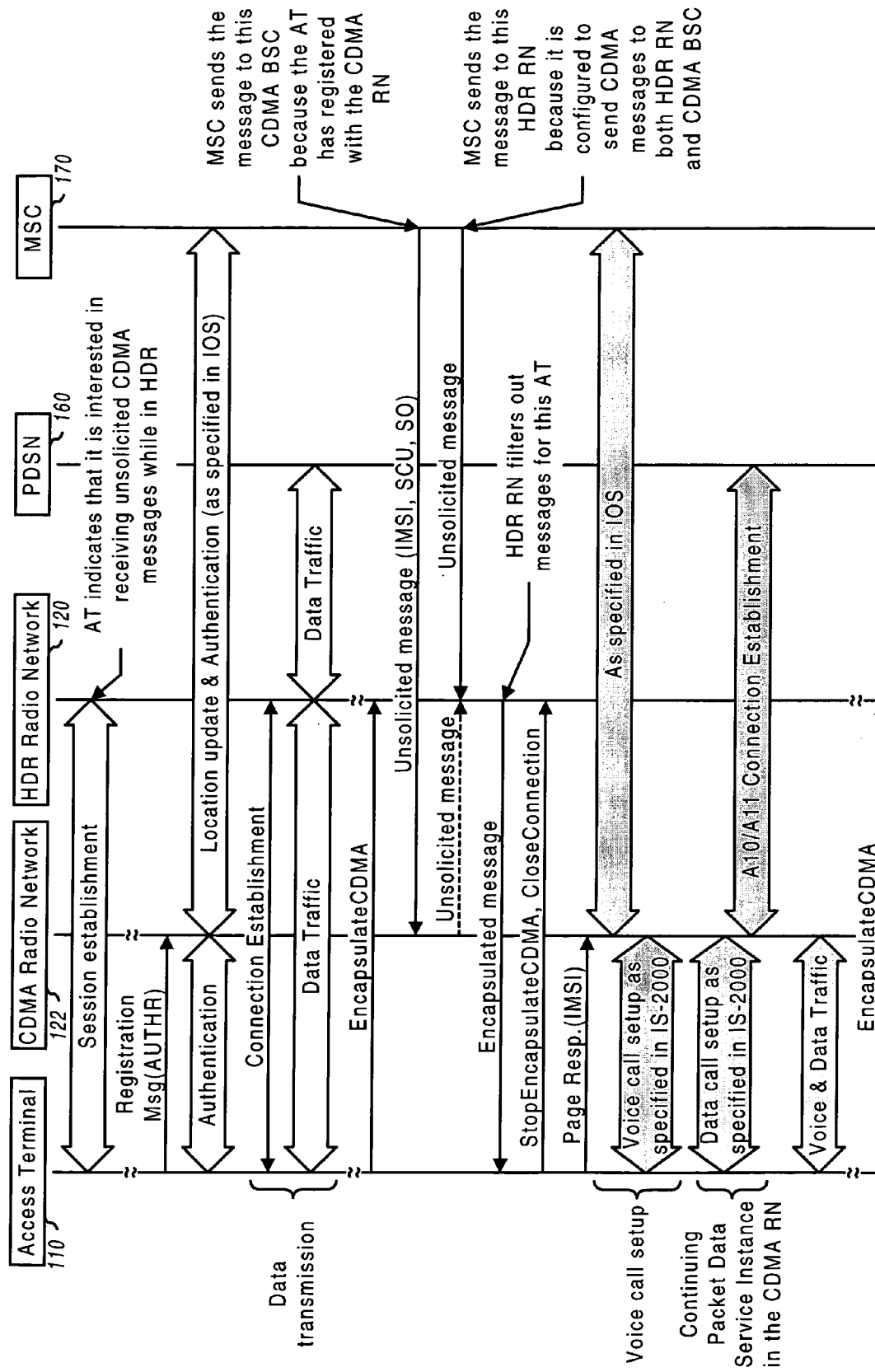
FIG. 4 is a diagram of an embodiment of a communication between various network elements to send a "voice page" to an access terminal while it is exchanging data with the HDR radio network.

FIG. 4 is a diagram of an embodiment of the communication between various network elements to send a "voice page" to an access terminal while it is exchanging data with the HDR radio network. Initially (e.g., upon entering the HDR registration boundary), the access terminal establishes a session with the HDR radio network. Session establishment typically includes UATI assignment, protocol negotiation, and parameter negotiation. Session configuration is performed by the access terminal and HDR radio network to establish a set of protocols (at various signaling layers) to be used for subsequent communication and to establish a set of parameters to be used for each established protocol. Default protocols and/or parameters may be selected for use. Alternatively, the protocols and/or parameters may be negotiated by both entities.

As part of the session configuration, a dual-mode access terminal typically sends it IMSI (International Mobile Station Identification) to the HDR radio network. The access terminal is also assigned a UATI (Unicast Access Terminal Identifier) that allows the HDR radio network to send messages specifically to this access terminal.

Session configuration are described in further detail in a document entitled "HDR Air Interface (HAI) Specification," hereinafter referred to as the HAI Specification, and in U.S. patent application Ser. No. 09/499,196, entitled "METHOD AND APPARATUS FOR PROVIDING CONFIGURABLE LAYERS AND PROTOCOLS IN A COMMUNICATIONS SYSTEM," filed Feb. 7, 2000, now U.S. Pat. No. 6,539,030, issued on Mar. 25, 2003, and assigned to the assignee of the present invention. Both of these documents are incorporated herein by reference. The. HAI Specification document has been provided to the standard body (3GPP2/TSG-C) and is the basis for development of a final standard.

In accordance with the invention, during the HDR session configuration, the access terminal further indicates to the HDR radio network that it is interested in receiving unsolicited CDMA messages while it has a session with the HDR radio network. The unsolicited CDMA messages are messages originated from the CDMA radio network and sent to the access terminal without the mobile station initiating the transaction. General page messages (GPM), Data Burst Messages carrying a Short Message Service data (SMS) are examples of unsolicited messages in IS-2000. The access terminal can further indicate the particular IS-2000 service options for which it would like related messages to be delivered to the access terminal through the HDR radio network. For example, the access terminal can indicate that it would like to receive general page messages (GPM) with a service option indicating voice service but not pages for short message service (SMS). Based on these indications, the HDR radio network can subsequently provide to the access terminal the designated messages from the CDMA radio network.

If the access terminal is within the registration boundary of the CDMA radio network, it can also register with the CDMA radio network by sending a registration message with authorization. In accordance with the IS-2000 standard, the access terminal has to prove to the CDMA BSC that it is who it claims to be. Therefore the access terminal generates a number (AUTHR) that only the true access terminal can generate (because only the true access terminal has a secret key). This authorization is described in the aforementioned IS-2000 standard. The registration message informs the CDMA radio network of the existence of the access terminal. After registration, the CDMA BSC can identify and track the access terminal. The registration of the access terminal with the CDMA radio network can be performed in accordance with the particular CDMA standard being implemented (e.g., the IS-2000 standard). A multi-mode access terminal can register with the CDMA radio network even if it is tuned to the HDR radio network.

Authentication is done as part of the registration and via the authentication fields inside the registration messages. Authentication is performed only when it's needed, such as when there is a chance that a "rouge" access terminal could impersonate the true access terminal. For example, without authentication a rouge access terminal can claim that it is access terminal X and have pages destined for access terminal X to be delivered where the rouge access terminal is located. If this occurs, the true access terminal won't get any of his calls. The CDMA radio network further communicates with the MSC to update the location of the access terminal and for authentication. The communication between the access terminal and CDMA radio network can be achieved via the applicable (e.g., IS-2000) CDMA standard, and the communication between the CDMA radio network and the MSC can be achieved as defined by the aforementioned Inter-operability Specification.

Once a session has been established with the HDR radio network, the access terminal can exchange data with the HDR radio network. Prior to a data exchange, a connection is established with the HDR radio network, if none is currently established. Via the connection establishment, the access terminal is assigned one or more traffic channels to be used for the data exchange. Thereafter, data can be exchanged between the access terminal and HDR radio network and between the HDR radio network and the PDSN. The established connection can be torn down, as directed by either the access terminal or the HDR radio network, or automatically after a particular period of inactivity. Any number of data exchanges can occur while the access terminal has an established session with the HDR radio network.

In an embodiment, the access terminal periodically sends an EncapsulateCDMA message to the HDR radio network to request it to start or continue forwarding (i.e., tunneling) unsolicited CDMA messages. This "keep alive" mechanism ensures that only access terminals that have indicated an interest to have the unsolicited CDMA messages forwarded are served in such manner, and that valuable air-link resources are not unnecessarily wasted by transmissions to uninterested access terminals. The keep-alive mechanism is described in further detail below.

Once the access terminal has been registered with the CDMA radio network, the CDMA radio network knows the existence and location of the access terminal but may not be aware of its communication with the HDR radio network (nor would this be necessary, in accordance with the invention). From the viewpoint of the CDMA radio network, messages are being processed in the normal manner. Thereafter, messages from the CDMA radio network can be forwarded to the access terminal in one of various embodiments.

If the access terminal has registered with the CDMA radio network, unsolicited CDMA messages (e.g., paging request messages) are sent by the MSC to the CDMA radio network. In accordance with one embodiment of the invention, if the access terminal has indicated that it would like to receive unsolicited CDMA messages while it is tuned to the HDR radio network, the MSC also sends these messages to the HDR radio network. In another embodiment, the CDMA radio network forwards the unsolicited CDMA messages to the HDR radio network (as shown by the dashed line in FIG. 4) if the access terminal has indicated that it would like to receive these messages while it is tuned to the HDR radio network. The unsolicited CDMA messages are thus sent by the MSC to the specific CDMA BSC, and can be sent by either the MSC or the CDMA BSC to the HDR BSC with which the access terminal has tuned.

The HDR radio network receives the unsolicited CDMA messages and identifies messages for each access terminal. If a particular access terminal previously indicated that it is interested in receiving unsolicited CDMA messages, then the HDR radio network encapsulates each message received for this access terminal and sends the encapsulated message to the access terminal. The HDR radio network continues to receive, filter, encapsulate, and send unsolicited CDMA messages to the access terminal until a StopEncapsulateCDMA message is received from the access terminal, or if the access terminal has disconnected from the HDR radio network.

Upon receiving and processing the encapsulated message from the HDR radio network, the access terminal can take appropriate responsive action. For example, if the access terminal receives a voice page while exchanging data with the HDR radio network, the access terminal can terminate the connection with the HDR radio network and establishes a voice call with the CDMA radio network. To close the connection with the HDR radio network, the access terminal can send a CloseConnection message to the HDR radio network. Since the access terminal will be establishing a session with the CDMA radio network, it will no longer need to have the HDR radio network encapsulate and forward unsolicited CDMA messages. Thus, the access terminal can also send a StopEncapsulateCDMA message to the HDR radio network to instruct it to stop forwarding unsolicited CDMA messages. Alternatively, the HDR radio network can automatically stop encapsulating and forwarding the unsolicited CDMA messages upon receiving the CloseConnection message from the access terminal.

The access terminal can establish a connection with the CDMA radio network by sending a page response message to the CDMA radio network. Upon receiving the page response message and depending on the type of communication being established, a voice call or data call (or both) can be set up with the CDMA radio network. To set up a voice call, the CDMA radio network communicates with the MSC, as specified in the aforementioned Inter-operability Specification, and further communicates with the access terminal, as specified in the applicable CDMA standard (e.g., the IS-2000 standard). And to set up a data call, the CDMA radio network communicates with the access terminal, as specified in the applicable CDMA standard, and further communicates with the PDSN, as specified in the Inter-operability Specification. Once a voice and/or data call has been set up, the access terminal exchanges voice and/or data traffic with the CDMA radio network. The data call with the CDMA radio network is used to continue the data exchanges between the access terminal and the PDSN, which was previously achieved via the HDR radio network.

Upon completion of the voice and/or data call with the CDMA radio network, the access terminal can terminate the connection with the CDMA radio network. Thereafter, the access terminal can send an EncapsulateCDMA message to the HDR radio network to resume receiving unsolicited CDMA messages. The access terminal can also establish another connection with the HDR radio network to exchange data, or can alternatively set up another voice and/or data call with the CDMA radio network.

The forwarding of unsolicited CDMA messages allows the CDMA radio network to communicate (e.g., page) an access terminal that is in communication with, or tuned to the HDR radio network. This allows the access terminal to continue to receive services from the CDMA radio network even though it is not tuned to that radio network.

Table 1 shows a specific embodiment of a message format for the encapsulated messages. In this embodiment, the encapsulated message includes three fields: (1) an ATI (Access Terminal Identifier) Record field, (2) a Message Identifier (ID) field, and (3) a CDMA message field. The ATI Record field includes a record specifying the recipient access terminal's address and is described in further detail in the aforementioned HAI Specification. The ATI Record field identifies the access terminal that the encapsulated message is destined for. The Message ID field indicates whether the message is an encapsulated message. And the CDMA message field includes the encapsulated message itself, e.g., the paging records of the recipient access terminal for which the encapsulated message is directed. Various other message formats can also be used and are within the scope of the invention.

TABLE 1

| Field | Description |
| --- | --- |
| ATI Record | If sent on the control channel |
| Message ID | Encapsulated CDMA message |
| CDMA message | e.g., Paging record corresponding to this AT |

The access terminal can receive the encapsulated messages via various mechanisms. In one mechanism, if the access terminal is in a connected state with the HDR radio network, it receives the encapsulated messages on the forward traffic channel.

Alternatively, if the access terminal does not have an open connection with the HDR radio network, other mechanisms can be used. For example, if the access terminal remains tuned to the HDR radio network, the HDR radio network can forward the unsolicited CDMA messages to the access terminal at its designated HDR control channel cycle. Otherwise, if the access terminal has tuned to the CDMA radio network, the access terminal can send a StopEncapsulateCDMA message to the HDR radio network, which then stops encapsulating and forwarding the unsolicited CDMA messages to the access terminal.

Other mechanisms to forward unsolicited CDMA messages can also be used and are within the scope of the invention. For example, these messages can be forwarded via a signaling channel, a control channel, a paging channel, or others.

In an embodiment, when the access terminal leaves the HDR radio network (e.g., in order to respond to a voice page), it sends a StopEncapsulateCDMA message to the HDR radio network, as shown in FIG. 4. Upon receiving the StopEncapsulateCDMA message, the HDR radio network stops encapsulating CDMA messages for the access terminal.

When the access terminal tunes back to the HDR radio network (e.g., after the voice call with the CDMA radio network has been terminated), it sends an EncapsulateCDMA message to the HDR radio network. Upon receiving the EncapsulateCDMA message, the HDR radio network starts or resumes encapsulating and forwarding CDMA messages for the access terminal, as the messages are received by the HDR radio network.

As noted above, in an embodiment, a keep-alive mechanism is used to ensure that the air-link resources are efficiently used. In one implementation of the keep-alive mechanism, the access terminal sends an EncapsulateCDMA message within each T1 time interval, which is measured from the time the most recent prior EncapsulateCDMA message was transmitted. The HDR radio network can stop encapsulating messages if it does not receive an EncapsulateCDMA message within T2 time interval. T1 and T2 can each be selected based on various parameters such as the signaling delays, the processing delays, and so on. As a specific example, T1 can be selected to be approximately 10 minutes, and T2 can be selected to be approximately twice T1. Other values can also be used for T1 and T2, and this is within the scope of the invention.

The HDR radio network can be designed to have similar "footprint" as that of the CDMA radio network. Specifically, the registration boundaries of the HDR radio network can be approximately aligned with the registration boundaries of the CDMA radio network. This can be achieved, for example, by co-locating the BTS and access points at the same cell sites and properly controlling their transmit power, as described in the aforementioned U.S. patent application Ser. No. 09/575,073, now U.S. Pat. No. 6,894,994, issued on May 17, 2005. If the registration boundaries are approximately aligned, the access terminal can register with both HDR and CDMA radio networks upon entering the boundaries.

In an overlay system (i.e., one that includes both HDR and CDMA radio networks) the operator can set the HDR registration boundaries so that a CDMA registration boundary is always coincide with some HDR registration. The opposite can be implemented to be true. That is, the operator can configure registration boundaries in HDR such that there are multiple HDR boundaries within one CDMA registration boundary. In this case, the access terminal can end up sending some unnecessary registrations to the CDMA radio network when it crosses an HDR registration boundary. Note that the rule is to register with the CDMA radio network whenever the access terminal crosses an HDR registration boundary.

Figure 5:
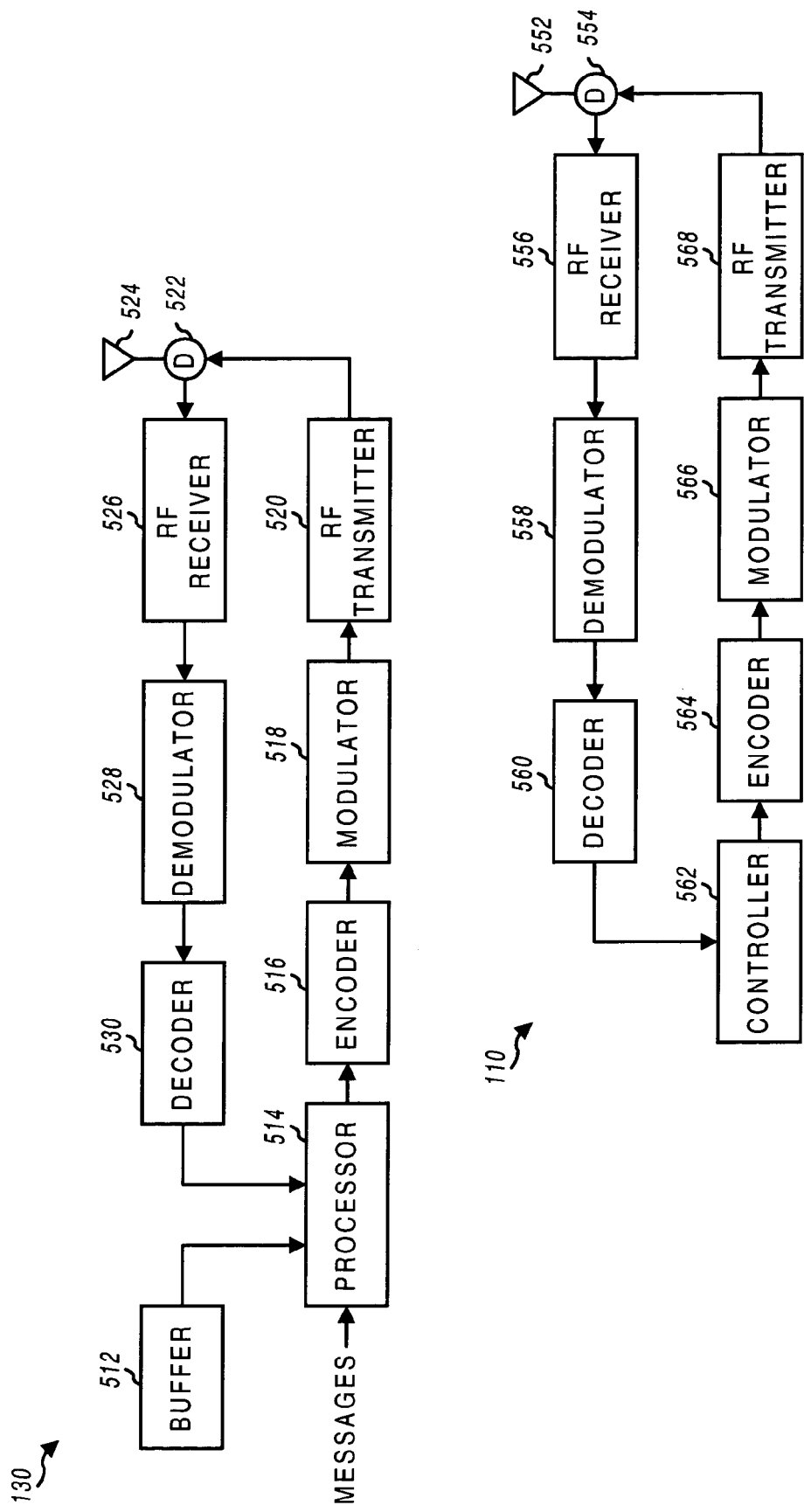
FIG. 5 is a block diagram of a specific embodiment of an access terminal and an access point.

FIG. 5 is a simplified block diagram of a specific embodiment of access terminal 110 and access point 130. At access point 130, unsolicited CDMA messages are provided (e.g., from the MSC or CDMA BSC) to a processor 514. If the unsolicited CDMA messages are to be forwarded to access terminal 110, processor 514 encapsulates the messages in accordance with a particular message format, such as the one described above.

The encapsulated message, the traffic data from a buffer 512, and control data from a processor 514 are then provided to an encoder 516 that codes the data with one or more coding schemes. The coding schemes may include, for example, cyclic redundancy check (CRC) coding, Turbo coding, convolutional coding, serial-concatenated coding, Reed-Solomon block coding, no coding, and so on, which are typically used for CDMA-based systems. The coded data is provided to a modulator 518 that further processes the coded data. For CDMA-based systems, modulator 518 may perform Walsh covering, pseudo-noise (PN) spreading, scrambling, and so on. The processed data is then converted into one or more analog signals. A transmitter 520 receives and modulates the analog signals with a particular modulation format (e.g., quadrature phase shift keying (QPSK), offset QPSK, or some other format), filters and amplifies the signal, and transmits the signal over-the-air via a duplexer (D) 522 and an antenna 524.

At access terminal 110, the transmitted signal is received by an antenna 552, routed through a duplexer (D) 554, and provided to a receiver 556. Receiver 556 conditions, demodulates, and digitizes the received signal and provides samples to a demodulator 558. The signal conditioning may include filtering, amplification, frequency conversion, and so on, and the demodulation is complementary to that performed at access point 130.

Demodulator 558 then processes the samples in a manner that is complementary to that performed at access point 130 (e.g., despreading, descrambling, and decovering) to provide symbols. A decoder 560 receives and decodes the symbols with one or more decoding schemes that are complementary to the coding scheme(s) used at access point 130. The decoded data is then provided to a controller 562.

Transmission of traffic data and messages (e.g., EncapsulateCDMA messages, StopEncapsulateCDMA messages, and so on) from access terminal 110 to access point 130 occurs via a complementary signal path. The traffic data from a buffer (not shown in FIG. 5) and messages are coded by an encoder 564, modulated by a modulator 566, conditioned by a transmitter 568, routed through duplexer 554, and transmitted via antenna 552. At access point 130, the transmitted signal is received by antenna 524, routed through duplexer 522, conditioned by an RF receiver 526, processed by a demodulator 528, decoded by a decoder 530, and provided to processor 514.

As used herein, a forward transmission refers to a transmission from access point 130 to access terminal 110, and a reverse transmission refers to a transmission from access terminal 110 to access point 130. The processing and decoding formats on the reverse path can be, and is typically, different from those of the forward path.

In FIG. 5, encoder 516, modulator 518, and transmitter 520 form a transmitter unit for access point 130, and receiver 526, demodulator 528, and decoder 530 form a receiver unit for access point 130. Similarly, encoder 564, modulator 566, and transmitter 568 form a transmitter unit for access terminal 110, and receiver 556, demodulator 558, and decoder 560 form a receiver unit for access terminal 110.

The elements of the access terminals and access points can be implemented in various manners. For example, these elements can be implemented using one or more application specific integrated circuits (ASICs), digital signal processors (DSPs), micro-controllers, microprocessors, other electronic circuits designed to perform the functions described herein, or a combination thereof. Also, some of the functions described herein can be implemented with a general-purpose processor or a specially designed processor operated to execute instruction codes that achieve the functions described herein. Thus, the elements of the access terminals and access points described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for receiving messages forwarded from a second radio network to a first radio network, the method comprising:

establishing a session with the first radio network;

sending to the first radio network an indication of an interest in receiving unsolicited messages from the second radio network; and receiving an encapsulated message from the first radio network, wherein the encapsulated message includes an unsolicited message from the second radio network that has been forwarded to the first radio network and wherein the first radio network continues to send the encapsulated message until the first radio network receives a message to stop encapsulation.

2. The method of claim 1, further comprising:

sending to the first radio network an indication of an interest to be paged for a particular set of service options.

3. The method of claim 1, further comprising:

registering with the second radio network prior to the receiving.

4. The method of claim 1, further comprising:

sending a first message to the first radio network to request the encapsulating and forwarding of the unsolicited messages from the second radio network.

5. The method of claim 4, wherein the first message is sent periodically within a first time interval.

6. The method of claim 5, wherein the encapsulating and forwarding of the unsolicited messages from the second radio network cease if the first message is not received within a second time interval, wherein the second time interval is longer than the first time interval.

7. The method of claim 1, further comprising:

sending a second message to the first radio network to request termination of the encapsulating and forwarding of the unsolicited messages from the second radio network.

8. The method of claim 1, further comprising:

sending a page response message to the second radio network in response to receiving the encapsulated message from the first radio network.

9. The method of claim 1, further comprising:

establishing a connection with the second radio network in response to receiving the encapsulated message.

10. The method of claim 1, wherein the encapsulated message includes an Access Terminal Identifier (ATI) Record field indicative of an address of a recipient access terminal, a Message ID field that indicates that the message is an encapsulated message, and a message field indicative of one or more paging records for the recipient access terminal.

11. The method of claim 1, wherein the unsolicited messages are sent from a mobile station controller to the first and second radio networks.

12. The method of claim 1, wherein the unsolicited messages are sent from the second radio network to the first radio network.

13. The method of claim 1, wherein the encapsulated message is received from the first radio network on a forward traffic channel.

14. The method of claim 1, wherein the encapsulated message is received from the first radio network on a designated control channel cycle.

15. The method of claim 1, wherein the encapsulated message received from the first radio network is a paging request message.

16. The method of claim 1, wherein the encapsulated message received from the first radio network is a voice page.

17. The method of claim 1, wherein the first radio network is a High Data Rate (HDR) radio network.

18. The method of claim 1, wherein the second radio network is a Code Division Multiple Access (CDMA) radio network that conforms to IS-2000 standard.

19. An access terminal in a spread spectrum communications system configured to implement the method of claim 1.

20. A method for receiving messages forwarded from a Code Division Multiple Access (CDMA) radio network to a High Data Rate (HDR) radio network, the method comprising:

establishing a session with the HDR radio network;

sending to the HDR radio network an indication of an interest in receiving unsolicited messages from the CDMA radio network;

registering with the CDMA radio network;

periodically sending a first message to the HDR radio network to request the encapsulating and forwarding of the unsolicited messages from the CDMA radio network; and receiving an encapsulated message from the HDR radio network, wherein the encapsulated message includes an unsolicited message from the CDMA radio network that has been forwarded to the HDR radio network and wherein the HDR radio network continues to send the encapsulated message until the HDR radio network receives a message to stop encapsulation.

21. An access terminal in a spread spectrum communications system comprising:

a transmitter unit operative to receive and code data and messages, modulate the coded data, and convert the modulated data into a modulated signal suitable for transmission over a transmission medium;

a receiver unit operative to receive a transmitted signal, demodulate the received signal to provide demodulated data, and decode the demodulated data to recover transmitted data and messages; and a controller coupled to the transmitter and receiver units and operative to direct establishment of a session with a first radio network, transmission to the first radio network an indication of an interest in receiving unsolicited messages from a second radio network, and reception and processing of an encapsulated message from the first radio network, wherein the encapsulated message includes an unsolicited message from the second radio network that has been forwarded to the first radio network and wherein the first radio network continues to send the encapsulated message until the first radio network receives a message to stop encapsulation.

22. A method for forwarding messages to an access terminal, the method comprising:

establishing a session with the access terminal;

receiving an indication from the access terminal of an interest in receiving unsolicited messages from a radio network;

receiving an unsolicited message from the radio network;

encapsulating the unsolicited message; and sending the encapsulated message to the access terminal until receipt of a message to stop encapsulation.

23. The method of claim 22, further comprising:

receiving a first message from the access terminal requesting the encapsulating and forwarding of unsolicited messages from a second radio network.

24. The method of claim 23, wherein the first message is received periodically from the access terminal, and wherein the encapsulating and forwarding of the unsolicited messages from the second radio network cease if the first message is not received within a particular time interval.

25. The method of claim 22, further comprising:

receiving a second message from the access terminal to request termination of the encapsulating and forwarding of unsolicited messages from the radio network.

26. An access point in a spread spectrum communications system comprising:

a transmitter unit operative to receive and code data and messages, modulate the coded data, and convert the modulated data into a modulated signal suitable for transmission over a transmission medium;

a receiver unit operative to receive a transmitted signal, demodulated the received signal to generate demodulated data, and decode the demodulated data to recover transmitted data and messages; and a controller coupled to the transmitter and receiver units and configured to direct establishment of a session with an access terminal, reception of an indication from the access terminal of an interest in receiving unsolicited messages from a radio network, reception of an unsolicited message from the radio network, encapsulation of the unsolicited message, and transmission of the encapsulated message to the access terminal until receipt of a message to stop encapsulation.

* * * * *